(12) United States Patent
Yoda

(10) Patent No.: US 6,954,227 B2
(45) Date of Patent: Oct. 11, 2005

(54) METHOD, APPARATUS, AND RECORDING MEDIUM FOR IMAGE CORRECTION

(75) Inventor: Akira Yoda, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 886 days.

(21) Appl. No.: 09/814,932

(22) Filed: Mar. 23, 2001

(65) Prior Publication Data
US 2004/0201696 A1 Oct. 14, 2004

(30) Foreign Application Priority Data
Mar. 24, 2000 (JP) ........................ 2000-083935

(51) Int. Cl.⁷ .................. H04N 5/228; H04N 9/04; H04N 9/73; G03F 3/08; G06K 9/00
(52) U.S. Cl. .................. 348/222.1; 348/207.99; 348/223.1; 358/518; 382/167; 382/162
(58) Field of Search .................. 348/207.99, 207.2, 348/222.1, 223.1; 358/1.9, 518, 523, 520, 504; 382/162, 167

(56) References Cited

U.S. PATENT DOCUMENTS

| | | | |
|---|---|---|---|
| 5,189,511 A | | 2/1993 | Parulski et al. |
| 5,594,557 A | * | 1/1997 | Rolleston et al. ........... 358/518 |
| 5,631,748 A | * | 5/1997 | Harrington ................. 358/520 |
| 5,668,596 A | | 9/1997 | Vogel |
| 5,710,871 A | | 1/1998 | Tadenuma et al. |
| 6,014,457 A | * | 1/2000 | Kubo et al. ................. 382/167 |
| 6,198,552 B1 | * | 3/2001 | Nagae ........................ 358/518 |
| 6,396,595 B1 | * | 5/2002 | Shimazaki ................... 358/1.9 |
| 6,668,077 B1 | * | 12/2003 | Ohkubo ...................... 382/162 |
| 6,707,573 B1 | * | 3/2004 | Ito et al. ..................... 358/1.9 |

FOREIGN PATENT DOCUMENTS

JP 07-254988 A 10/1995

* cited by examiner

Primary Examiner—Wendy R. Garber
Assistant Examiner—Luong T. Nguyen
(74) Attorney, Agent, or Firm—Birch, Stewart, Kolasch & Birch, LLP

(57) ABSTRACT

An image correction method obtains scanned image data by photoelectrically reading a proof print obtained from original image data representing an original image. The method carries out a first color conversion for obtaining converted scanned image data by converting the scanned image data into a common color space corresponding to color perception; calculates a relationship between data values of the converted scanned image data and data values of the original image data as a color correspondence relationship; carries out a second color conversion for obtaining converted original image data by converting the original image data into the common color space based on the color correspondence relationship; carries out a third color conversion for obtaining print image data by converting the converted original image data from the common color space into a color space for printing; and obtains a print based on the print image data.

9 Claims, 14 Drawing Sheets

FIG.6

| | |
|---|---|
| FILE NAME | : File 001.jpg |
| QUANTITY | : 3 |
| WHITE MARGIN | : NO |
| GLOSSY OR NON-GLOSSY | : GLOSSY |

METHOD, APPARATUS, AND RECORDING MEDIUM FOR IMAGE CORRECTION

BACKGROUND OF THE INVENTION

1. Field of the Invention

The present invention relates to a method and an apparatus for correcting original image data representing an original image upon printing thereof. The present invention also relates to a computer-readable recording medium storing a program to cause a computer to execute the image correction method.

2. Description of the Related Art

When a user requests photographic printing of image data obtained by a digital camera from a laboratory, the user confirms the content of an image by printing the image data as a proof print with a household printing apparatus such as an ink jet printer. Upon requesting the printing, the image data are provided to the laboratory together with order information for requesting the printing, via a network or by being recorded in a recording medium. In the laboratory, a photographic print of the image data is generated based on the order information. At this time, in order to cause the print to have appropriate color reproducibility, various corrections are carried out on the image data in the laboratory. As methods of carrying out corrections on image data, various methods have been proposed. In one method, RGB color image data are color-converted by using matrix operations so that a print has appropriate color reproducibility (U.S. Pat. No. 5,189,511, for example). In another method, coefficients of a matrix are set in accordance with a characteristic of a printing apparatus as an output device and characteristics of a digital camera and a scanner for obtaining image data so that a print having more preferable color reproducibility can be obtained (U.S. Pat. No. 5,668,596, for example).

However, color reproducibility becomes completely different between prints obtained by using a household printing apparatus and by a printing apparatus in a laboratory, due to differences in color processing methods and coloring characteristics of color materials and/or recording methods employed by these printing apparatus. Therefore, even if the method described in U.S. Pat. No. 5,189,511 or U.S. Pat. No. 5,668,596 is used, color reproducibility does not agree completely between the photographic print and the proof print. As a result, even if the user carries out various kinds of image processing on the image data by using his/her personal computer so as to obtain desirable color reproducibility, the photographic print cannot reflect a result of the image processing, due to the differences in the methods of the color processing and the like.

Meanwhile, a printing apparatus has a color profile describing how colors of input image data appear. Therefore, the laboratory may generate a photographic print having the same color reproducibility as the proof print generated by the household printing apparatus, by referring to the color profile of the printing apparatus provided to the laboratory. In an ink jet printer generally used as a household printing apparatus, the color reproducibility varies, depending on a printing condition such as a standard mode and a high-definition mode. In this case, if color profiles corresponding to all the printing conditions are available, the photographic print having the same color reproducibility as the proof print depending on the printing conditions can be obtained. However, the color profiles corresponding to all the printing conditions are not necessarily available for the household printing apparatus. Furthermore, even if the color profiles are available, specifying a color profile corresponding to an individual printing condition is difficult in some cases. Moreover, formats of the color profiles vary, depending on the printing apparatus. Therefore, the printing apparatus in the laboratory may not read the color profiles of the household printing apparatus.

In the case where the proof print is obtained by correcting colors of image data by using a printer driver, the image data themselves are not subjected to any image processing. Therefore, even if the color profiles are available, the color reproducibility does not agree between the photographic print generated by the laboratory and the proof print.

The proof print may be provided to the laboratory as a color sample. However, causing the color reproducibility of the prints to agree completely is extremely difficult, and an operator of the laboratory may not be skilled enough. If the operator has the skill, the color reproducibility may agree, but productivity decreases.

Meanwhile, if development of a film and generation of first prints of images recorded on the film is requested from a laboratory, a user receives photographic prints for all frames in the film from the laboratory. If the user desires to have an additional print, additional printing of a desired frame is requested. In this case, even in the laboratory that has generated the first prints, colors of the additional print may be different from colors of the corresponding first print, due to changes in printing conditions such as exposure time and a printing environment. In the case where additional printing is requested from a laboratory different from the laboratory that has generated the first prints, the same problem occurs, since printing apparatus generally vary in each laboratory.

Even if the laboratories have identical printing apparatus, or even if the user has the same printing apparatus as in the laboratory, the color reproducibility of the additional print can be different from that of the first print, due to the difference in the printing condition.

Another method of printing using color chart data has also been proposed (Japanese Unexamined Patent Publication No. 7(1995)-254988, for example). In this method, a printing apparatus prints a color chart by using color chart data, and a scanner photoelectrically reads the color chart to generate scanned image data. A table relating data values of the scanned image data and data values of color patches in the color chart is then generated. Meanwhile, the scanner photoelectrically reads a proof print, and image data obtained by the reading are printed after being converted according to the table. By using this method, color reproducibility of a proof print or a first print (hereinafter either of these prints is called a proof print) agrees with a photographic print generated in a laboratory.

However, the method described in Japanese Unexamined Patent Publication No. 7(1995)-254988 contains factors causing image quality degradation, such as defocus and flare of an optical system in a scanner, and degradation and noise of an imaging device upon sampling. Furthermore, a print to be read tends to have a scar and a stain such as fingerprints, and colors degrade due to fading and alteration with time. Therefore, quality of a photographic print generated according to this method becomes lower.

SUMMARY OF THE INVENTION

The present invention has been conceived based on consideration of the above problems. An object of the present invention is therefore to provide an image correction method and an image correction apparatus for enabling color reproducibility of a photographic print to agree with color reproducibility of a proof print without causing image quality degradation, and to provide a computer-readable recording medium storing a program to cause a computer to execute the image correction method.

A first image correction method of the present invention comprises the steps of:

obtaining scanned image data by photoelectrically reading a proof print obtained from original image data representing an original image;

carrying out a first color conversion for obtaining converted scanned image data by converting the scanned image data into a common color space corresponding to color perception;

finding a relationship between data values of the converted scanned image data and data values of the original image data as a color correspondence relationship;

carrying out a second color conversion for obtaining converted original image data by converting the original image data into the common color space based on the color correspondence relationship;

carrying out a third color conversion for obtaining print image data by converting the converted original image data from the common color space into a color space for printing; and obtaining a printed image based on the print image data.

As the "original image data", image data obtained by a digital camera and image data obtained by photoelectrically reading an image recorded on a film or the like with reading means such as a scanner can be used. Furthermore, the original image data include raw image data and image data after image processing such as color correction. Therefore, as the "proof print", a print obtained by printing image data obtained by a digital camera or the like as they are or a print generated by printing the image data after image processing can be used. The proof print refers to a print having color reproducibility which can be used as a color sample, such as a print generated by using a household printing apparatus like an ink jet printer owned by a user, a print generated by a user's printing apparatus which is the same as a printing apparatus at a laboratory, and a first print obtained at the same time of developing a film in a laboratory.

The "common color space corresponding to color perception" refers to the CIE1931XYZ color space, the CIE1976Lab color space, or the CIE1976Luv color space, for example. Strictly speaking, a CIEXYZ color space corresponds to color perception or color stimulus. However, if an observation environment, that is, a lighting condition is defined a certain CIEXYZ color space corresponds to a certain CIELab color space on a one-to-one basis. Since the present invention aims to cause a printed image and a proof print to have the same color reproducibility, the observation environment is assumed to be the same between the printed image and the proof print. Therefore, the CIE1931XYZ color space is included in the common color space corresponding to color perception in the present invention.

The scanned image data are converted into the common color space in the following manner. First, a color chart is output by a printing apparatus that is the same as a printing apparatus that generated the proof print. The color chart comprises a plurality of color patches whose colorimetric values are known in the common color space. The color chart is read by image reading means for obtaining the scanned image data, and a relationship between the readings and the colorimetric values is found as a three-dimensional look-up table, for example. Based on the relationship, the scanned image data are converted into the common color space.

The converted original image data are converted into the color space for printing in the following manner. First, a color chart comprising a plurality of color patches whose data values are determined in the color space for printing is output by printing means that generates the printed image. The color chart is then subjected to colorimetry and a relationship between the calorimetric values and the data values in the color space for printing is found as a three-dimensional look-up table. Based on the relationship, the converted original image data are converted.

In the first image correction method of the present invention, it is preferable for converted scanned image data to be obtained according to the steps of:

averaging and sampling the scanned image data in each of areas having a predetermined range; and obtaining the converted scanned image data by converting the sampled scanned image data into the common color space. In this case, it is preferable for the color correspondence relationship to be found according to the steps of:

averaging and sampling the original image data in each of the areas having the predetermined range; and calculating the color correspondence relationship as a relationship between data values of a converted scanned image represented by the converted scanned image data and a sampled original image represented by the sampled original image data, at positions corresponding to each other in the sampled original image and in the converted scanned image.

It is also preferable for the color correspondence relationship to be calculated as a look-up table.

A second image correction method of the present invention comprises the steps of:

obtaining scanned image data and ID information added inseparably to a proof print for identifying an original image, by photoelectrically reading the proof print obtained from original image data representing the original image;

carrying out a first color conversion for obtaining converted scanned image data by converting the scanned image data into a common color space corresponding to color perception;

reading equivalent original image data representing an equivalent original image corresponding to the obtained ID information from storage means storing a plurality of original image data sets by relating the data sets to ID information;

calculating a relationship between data values of the converted scanned image data and the equivalent original image data as a color correspondence relationship;

carrying out a second color conversion for obtaining converted original image data by converting the equivalent original image data into the common color space based on the color correspondence relationship;

carrying out a third color conversion for obtaining print image data by converting the converted original image data from the common color space into a color space for printing; and obtaining a printed image based on the print image data.

The "ID information" can be any information by which the original image can be identified, such as an ID number or a file name of the original image data.

The "ID information added inseparably to a proof print" refers to ID information printed by using a bar code or a number at a margin of the proof print if the proof print has the margin, or on the back of the proof print, for example. However, the proof print may have been generated by pasting the original image on a mount, or the proof print may not have the margin. In other cases, the proof print may be double-sided. Therefore, it is preferable for the ID information to be embedded secretly in the original image. Various references are available for a method of secretly embedding information in an image (see Kineo Matsui, 1997, "Electronic watermark" (in Japanese), O Plus E No. 213, for example).

The ID information may be added to the proof print by the user or by a laboratory for carrying out the present invention. The storage means for storing the original image data sets may be installed in a personal computer of the user or in the laboratory. Furthermore, an image server located separately from the user or the laboratory may be used as the storage means. If the user has the storage means or if an image server is used as the storage means, it is preferable for the laboratory to be connected to the user and to the image server via a network so that the image data can be exchanged via the network.

In the second image correction method of the present invention, it is preferable for the converted scanned image data to be obtained according to the steps of:

averaging and sampling the scanned image data in each of areas having a predetermined range; and obtaining the converted scanned image data by converting the sampled scanned image data into the common color space. In this case, it is preferable for the color correspondence relationship to be calculated according to the steps of:

averaging and sampling the equivalent original image data in each of the areas having the predetermined range; and calculating the color correspondence relationship as a relationship between data values of a converted scanned image represented by the converted scanned image data and a sampled original image represented by the sampled equivalent original image data, at positions corresponding to each other in the sampled original image and in the converted scanned image.

It is also preferable for the color correspondence relationship to be calculated as a look-up table.

A first image correction apparatus of the present invention comprises:

image reading means for obtaining scanned image data by photoelectrically reading a proof print generated from original image data representing an original image;

first color conversion means for obtaining converted scanned image data by converting the scanned image data into a common color space corresponding to color perception;

calculation means for calculating a relationship between data values of the converted scanned image data and data values of the original image data as a color correspondence relationship;

second color conversion means for obtaining converted original image data by converting the original image data into the common color space based on the color correspondence relationship;

third color conversion means for obtaining print image data by converting the converted original image data from the common color space into a color space for printing; and printing means for obtaining a printed image based on the print image data.

In the first image correction apparatus of the present invention, it is preferable for the first color conversion means to serve as means for obtaining the converted scanned image data by averaging and sampling the scanned image data in each of areas having a predetermined range and by converting the sampled scanned image data into the common color space. In this case, it is preferable for the calculation means to serve as means for averaging and sampling the original image data in each of the areas having the predetermined range, and for calculating the color correspondence relationship as a relationship between data values of a converted scanned image represented by the converted scanned image data and a sampled original image represented by the sampled original image data, at positions corresponding to each other in the sampled original image and in the converted scanned image.

In the first image correction apparatus of the present invention, it is preferable for the calculation means to calculate the color correspondence relationship as a look-up table.

A second image correction apparatus of the present invention comprises:

image reading means for obtaining scanned image data and ID information added inseparably to a proof print for identifying an original image, by photoelectrically reading the proof print obtained from original image data representing the original image;

storage means for storing a plurality of original image data sets related to ID information;

first color conversion means for obtaining converted scanned image data by converting the scanned image data into a common color space corresponding to color perception;

reading means for reading equivalent original image data representing an equivalent original image corresponding to the obtained ID information from the storage means;

calculation means for calculating a relationship between data values of the converted scanned image data and the equivalent original image data as a color correspondence relationship;

second color conversion means for obtaining converted original image data by converting the equivalent original image data into the common color space based on the color correspondence relationship;

third color conversion means for obtaining print image data by converting the converted original image data from the common color space into a color space for printing; and printing means for obtaining a printed image based on the print image data.

It is preferable for the first color conversion means of the second image correction apparatus of the present invention to serve as means for obtaining the converted scanned image data by averaging and sampling the scanned image data in each of areas having a predetermined range and by converting the sampled scanned image data into the common color space. In this case, it is also preferable for the calculation means to serve as means for averaging and sampling the equivalent original image data in each of the areas having the predetermined range and for calculating the color correspondence relationship as a relationship between data values of a converted scanned image represented by the converted scanned image data and a sampled original image represented by the sampled original image data, at positions corresponding to each other in the sampled original image and in the converted scanned image.

In the second image correction apparatus of the present invention, it is preferable for the calculation means to calculate the color correspondence relationship as a look-up table.

The first and second image correction methods of the present invention may be provided as programs recorded in a computer-readable recording medium to cause a computer to execute the methods.

According to the first image correction method and the first image correction apparatus of the present invention, the proof print generated from the original image data representing the original image is photoelectrically read, and the scanned image data are obtained. The scanned image data are then converted into the common color space corresponding to color perception, and the converted scanned image data are obtained. The relationship between the data values of the converted scanned image data and the data values of the original image data are calculated as the color correspondence relationship. If the original image data and the converted scanned image data are data in an RGB color space and in the CIE1976Lab color space respectively, the calculated color correspondence relationship represents a relationship between RGB and Lab. After the color correspondence relationship is found in the above manner, the converted original image data are obtained by converting the original image data into the common color space based on the color correspondence relationship. The converted original image data are then converted into the color space for printing, and the print image data are obtained. The print image data are then output as the printed image.

If a printing apparatus by which the proof print has been generated and a printing apparatus for obtaining the printed image are different, color reproducibility becomes different in the proof print and the printed image due to differences in color processing methods, coloring characteristics of color materials and/or recording methods or the like. Even if the same printing apparatus are used, the color reproducibility can vary due to a difference in a printing condition such as exposure time. Therefore, the color reproducibility of the proof print becomes different from the color reproducibility of the printed image generated by printing the original image data as they are or from a print generated by printing the scanned image data as they are.

In the present invention, the converted scanned image data are obtained by converting the scanned image data into the common color space, and the converted original image data are obtained by finding the relationship between the original image data and the converted scanned image data. The converted original image data in the common color space are further converted into the color space for printing, and the print image data are obtained. If the original image data are converted into the common color space, the data values of the converted original image data correspond to the data values of the converted scanned image data. Therefore, by converting the original image data according to the color correspondence relationship, colors in the original image are related to colors in the proof print one to one. Meanwhile, by converting the converted original image data into the printing color space, data values of the print image data correspond to the data values of the converted original image data. As a result, colors of the original image and the printed image correspond one to one. Consequently, the colors of the proof print correspond to the colors of the printed image one to one. In this manner, color reproducibility of the printed image agrees with color reproducibility of the proof print even if the printing apparatus for generating the printed image and the proof print are not the same or even if the color processing methods, the coloring characteristics of color materials and/or recording methods are not the same, or even if printing conditions are not the same for the same printing apparatus. In this manner, the printed image having high fidelity to the color reproducibility of the proof print can be generated.

Furthermore, the converted scanned image data are obtained by averaging and sampling the scanned image data in each of the areas having the predetermined range and by converting the sampled scanned image data into the common color space. By averaging and sampling the original image data in the same manner as the scanned image data and by finding the relationship between the data values at the positions corresponding to each other in the sampled original image and the converted scanned image represented by the converted scanned image data obtained by the sampling, the color correspondence relationship for converting the original image data into the common color space can be found.

If the color correspondence relationship between the data values of the image represented by the converted scanned image data (the converted scanned image) and the original image is found for pixels corresponding to each other in the two images, an amount of operation therefor becomes large. Furthermore, since the converted scanned image data are generated by converting the scanned image data obtained by photoelectrically reading the proof print, the scanned image itself is blurry due to defocus and flare of an optical system in the reading means, for example. As a result, accurate position matching of the converted scanned image with the original image becomes difficult.

Therefore, by finding the relationship for converting the original image data into the common color space, accurate position matching of the converted scanned image with the original image becomes unnecessary, and the amount of operation can be reduced.

By calculating the color correspondence relationship as the look-up table, the original image data can be converted into the common color space by simply referring to the look-up table. Therefore, operation for conversion can be carried out fast.

According to the second image correction method and the second image correction apparatus of the present invention, the proof print having the ID information inseparable from the proof print for identifying the original image is photoelectrically read, and the scanned image data and the ID information are obtained. The scanned image data are converted into the common color space corresponding to color perception, and the converted scanned image data are obtained. Meanwhile, the equivalent original image data corresponding to the ID information obtained at the time of obtaining the scanned image data are read from the storage means storing the plurality of original image data sets and the ID information related thereto. The relationship between the data values of the converted scanned image data and the equivalent original image data is calculated as the color correspondence relationship. After the color correspondence relationship is found in the above manner, the converted original image data are obtained by converting the equivalent original image data into the common color space, based on the color correspondence relationship. The converted original image data are converted into the color space for printing, and the print image data are obtained. The printed image is then generated by printing the print image data.

Therefore, according to the second image correction method and the second image correction apparatus of the present invention, color reproducibility of the printed image can be the same as color reproducibility of the proof print, and the printed image having high fidelity to the color reproducibility of the proof print can be obtained.

Since the proof print has the ID information for identifying the original image data, by obtaining the ID information from the proof print, the original image data from which the proof print has been generated can be identified. Therefore, upon requesting output of the printed image, simply by providing the proof print to a laboratory that carries out the present invention without identifying the original image data, the laboratory can identify the original image data, which is convenient for a user.

Furthermore, by finding the relationship for converting the equivalent original image data into the common color space, accurate position matching between the converted scanned image and the equivalent original image becomes unnecessary, and the number of required operations can therefor be reduced.

Moreover, by calculating the color correspondence relationship as the look-up table, the original image data can be converted into the common color space with reference to the look-up table. Therefore, a conversion operation therefor can be carried out fast.

BRIEF DESCRIPTION OF THE DRAWINGS

FIG. 6 shows the content of order information;

DESCRIPTION OF THE PREFERRED EMBODIMENTS

Hereinafter, embodiments of the present invention will be explained with reference to the accompanying drawings.

Figure 1:
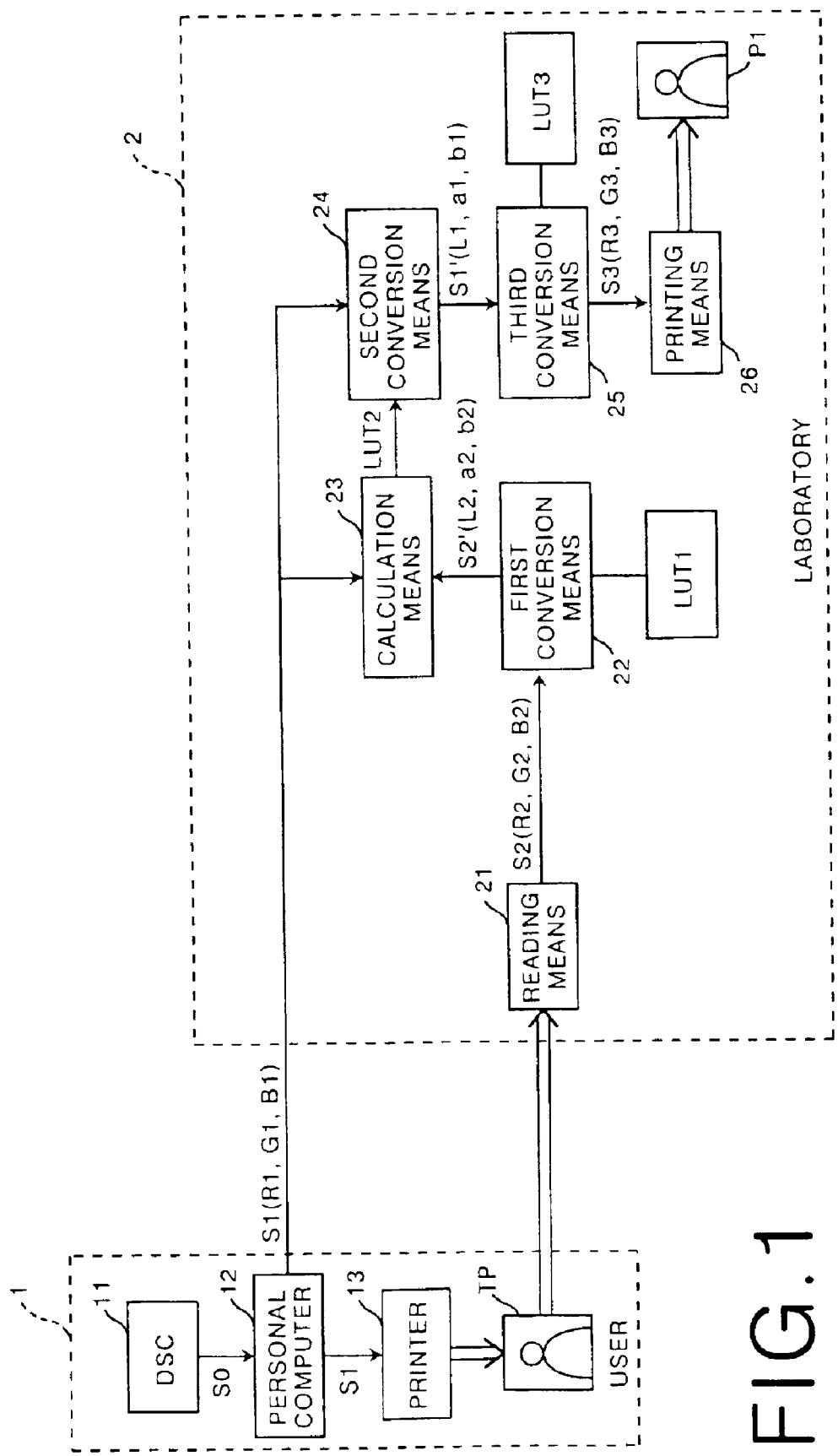
FIG. 1 is a block diagram showing a configuration of an image output system adopting an image correction apparatus as a first embodiment of the present invention.

FIG. 1 is a block diagram showing a configuration of an image output system adopting an image correction apparatus as a first embodiment of the present invention. As shown in FIG. 1, the image output system in this embodiment exchanges data and a print between a user 1 and a laboratory 2. The user 1 obtains original image data S0 by using a digital camera (DSC) 11, and generates processed original image data S1 by carrying out various kinds of image processing on the original image data S0 by using a personal computer 12. The user 1 obtains a proof print TP having desired colors by using a household printer 13 such as an ink jet printer. The original image data S0 may be obtained by reading an original image such as a photographic film with a scanner. In this embodiment, the original image data S0 comprise R0, G0, and B0 color data while the processed original image data S1 comprise R1, G1, and B1 color data. The user 1 may record the processed original image data S1 in a recording medium such as an FD to provide the medium to the laboratory 2. Alternatively, the original image data S1 may be provided to the laboratory 2 via a network. The user 1 brings or mails the proof print TP to the laboratory 2.

The laboratory 2 comprises reading means 21 such as a scanner for obtaining scanned image data S2 (R2, G2, B2) representing an image of the proof print TP by photoelectrically reading the proof print TP, first conversion means 22 for obtaining converted scanned image data S2' (L2, a2, b2) by converting the scanned image data S2 into a common color space (the CIE1976Lab color space in this embodiment) corresponding to color perception with reference to a three-dimensional look-up table LUT1 (hereinafter simply called LUT1), calculation means 23 for calculating a relationship between data values of the processed original image data S1 and the converted scanned image data S2' as a three-dimensional look-up table LUT2 (hereinafter simply called LUT2), second conversion means 24 for obtaining converted original image data S1' by converting the original image data S1 into the Lab color space according to LUT2, third conversion means 25 for obtaining print image data S3 (R3, G3, B3) by converting the converted original image data S1' into a printing color space by referring to a three-dimensional look-up table LUT3 (hereinafter simply called LUT3), and printing means 26 for obtaining a print P1 by printing the print image data S3.

In this embodiment, the CIE1976Lab color space is used as the common color space. However, the CIE1976Luv color space may be used instead of the CIE1976Lab color space. Furthermore, the CIE1931XYZ color space may also be used provided that the same light source is used for observing the proof print TP and the print P1.

Figure 2:
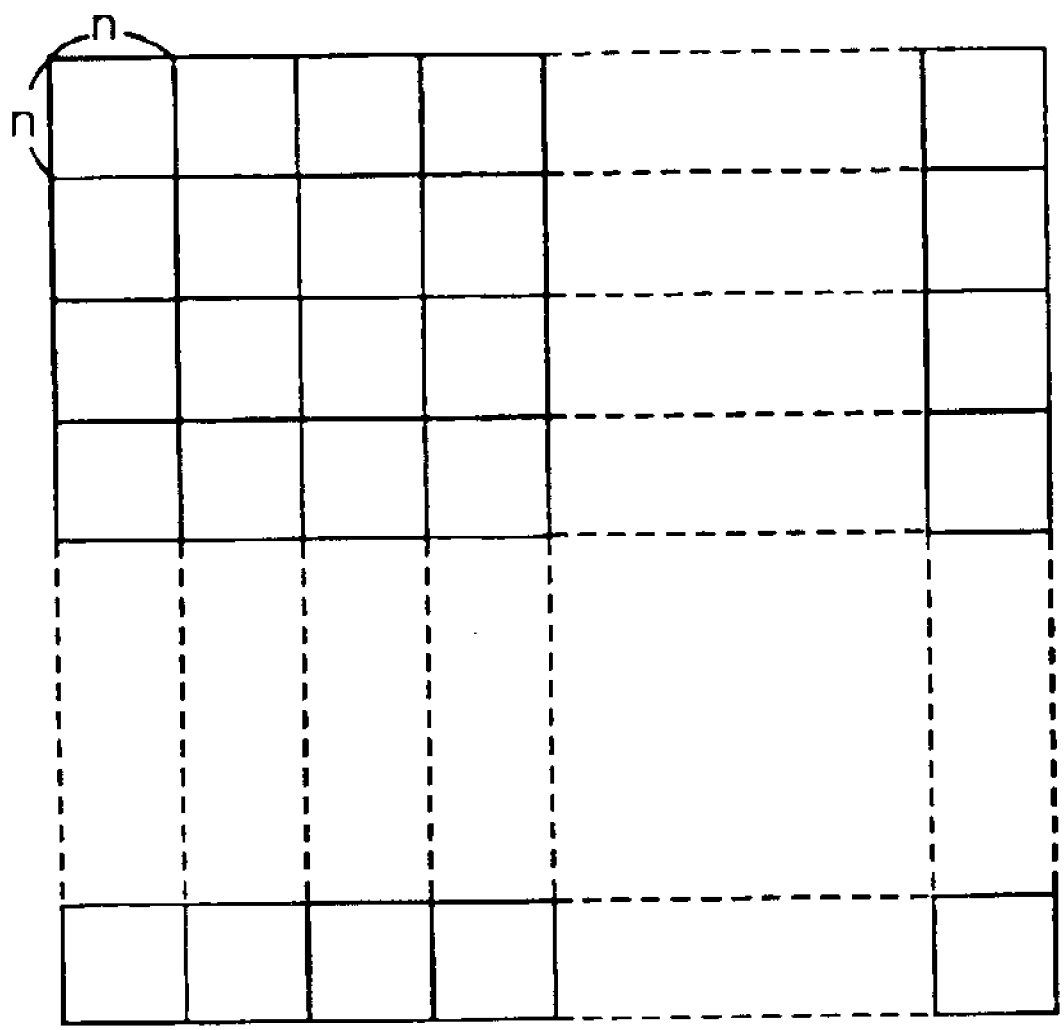
FIG. 2 is a diagram showing how a scanned image is divided.

The first conversion means 22 divides a scanned image represented by the scanned image data S2 into areas each comprising n×n (4×4, for example) pixels as shown in FIG. 2, and finds an average of pixel values in each area. The first conversion means 22 then converts the scanned image into a mosaic-like image by using the average in each area as the pixel value in the area. The first conversion means 22 obtains the converted scanned image data S2' (L2, a2, b2) by converting the scanned image data S2 (R2, G2, B2) of the mosaic-like image into the Lab color space according to LUT1. In this manner, the data values L2, a2, and b2 are obtained for each of the areas having the n×n pixels in the converted scanned image data S2'.

LUT1 is found in the following manner. First, the printer 13 prints a color chart having a plurality of color patches. Each patch is subjected to colorimetry and colorimetric values in the Lab color space are found. The color chart is read by the reading means 21. A relationship between RGB data of the color patches obtained by reading and the colorimetric values in the Lab color space is found as a three-dimensional look-up table, which is used as LUT1.

Spectral reflectance data of the color patches of the color chart is measured. The reflectance data are converted into the CIE1976Lab color space in the following manner. First, the spectral reflectance of the color chart is measured in a predetermined reference light source and spectral reflectance $R(\lambda)$ obtained in the above manner is converted into CIE1931XYZ tristimulus values according to Equation (1) below:

$$X = \frac{1}{k}\int S(\lambda)R(\lambda)\overline{X}(\lambda)d\lambda \quad (1)$$

$$Y = \frac{1}{k}\int S(\lambda)R(\lambda)\overline{Y}(\lambda)d\lambda$$

$$Z = \frac{1}{k}\int S(\lambda)R(\lambda)\overline{Z}(\lambda)d\lambda$$

Here, $S(\lambda)$ is a spectral distribution of the reference light source and k is a constant for standardization.

The CIE1976Lab values are found by using the tristimulus values XYZ according to Equation (2) below:

$$a^* = 500\{f(X/Xn) - f(Y/Yn)\}$$

$$b^* = 200\{f(Y/Yn) - f(Z/Zn)\} \quad (2)$$

$$L^* = 116(Y/Yn)^{1/3} - 16 \text{ (if } Y/Yn > 0.008856)$$

$$L^* = 903.25(Y/Yn) \text{ (if } Y/Yn \leq 0.008856)$$

If X/Xn, Y/Yn, Z/Zn > 0.008856, $$f(a/an) = (a/an)^{1/3} \text{ (a=X, Y, Z)}$$

If X/Xn, Y/Yn, Z/Zn $\leq$ 0.008856, $$f(a/an) = 7.787(a/an) + 16/116$$

Here, Xn, Yn, and Zn are tristimulus values for white color and can be substituted by tristimulus values corresponding to CIED65. The CIE1976Lab values are represented by using "*", as shown in Equation (2). However, in this specification, L, a, and b are used without adding "*" thereto.

The calculation means 23 calculates LUT2 in the following manner. First, an original image represented by the original image data S1 are divided into areas of n×n (such as 4×4) pixels each as in the case of the scanned image of the proof print TP, and an average of each area is found. The areas correspond to the areas having the n×n pixels each in the converted scanned image data S2'. The original image is then converted into a mosaic-like image having the average as a pixel value of each area. A relationship is found between the data values R1, G1, and B1 in each area of n×n pixels in the original image and the data values L2, a2, and b2 in each corresponding area of the n×n pixels in a converted scanned image represented by the converted scanned image data S2'.

More specifically, tristimulus values X2, Y2, and Z2 are found by solving Equation (2) for the data values L2, a2, and b2. The tristimulus values X2, Y2, and Z2 have a relationship with the data values R1, G1, and B1, as shown by Equation (3) below:

$$\begin{bmatrix} X2 \\ Y2 \\ Z2 \end{bmatrix} = M1 \begin{bmatrix} R1 \\ G1 \\ B1 \\ 1 \end{bmatrix} \quad (3)$$

Here, the matrix M1 is a 3×4 matrix. Therefore, the matrix M1 is found by finding coefficients of the matrix M1 according to the least square method by using Equation (3) for each of the areas of n×n pixels. Using the matrix M1 and Equation (2), the relationship between the data values R1, G1, and B1 and the data values L2, a2, and b2 is found for all colors as a three-dimensional look-up table, and used as LUT2.

The relationship between the tristimulus values X2, Y2, and Z2 and the pixel values R1, G1, and B1 can be represented by pixel values R1, G1, and B1 of higher degrees, as shown by Equations (4) and (5) below:

$$\begin{bmatrix} X2 \\ Y2 \\ Z2 \end{bmatrix} = M2 \begin{bmatrix} R1 \\ G1 \\ B1 \\ R1^2 \\ G1^2 \\ B1^2 \\ R1G1 \\ G1B1 \\ B1R1 \\ 1 \end{bmatrix} \quad (4)$$

$$\begin{bmatrix} X2 \\ Y2 \\ Z2 \end{bmatrix} = M3 \begin{bmatrix} R1 \\ G1 \\ B1 \\ R1^2 \\ G1^2 \\ B1^2 \\ R1G1 \\ G1B1 \\ B1R1 \\ R1^3 \\ G1^3 \\ B1^3 \\ R1^2G1 \\ R1^2B1 \\ G1^2R1 \\ G1^2B1 \\ B1^2R1 \\ B1^2G1 \\ R1G1B1 \\ 1 \end{bmatrix} \quad (5)$$

Here, M2 is a 3×10 matrix and M3 is a 3×20 matrix.

In this case, the matrices M2 and M3 are found by calculating elements of the matrices according to the least square method using the relationships represented by Equations (4) and (5) for all the n×n pixel areas. The relationship between the data values R1, G1, and B1 and the data values L2, a2, and b2 is found for all colors by using Equation (2) and the matrices M2 and M3, and can be used as LUT2.

In order to find LUT2, if the relationship between the data values of the converted scanned image represented by the converted scanned image data S2' and the data values of the original image is found for each corresponding pixel, the number of required operations therefor becomes large. Furthermore, since the converted scanned image data S2' are obtained by converting the scanned image data S2 obtained by photoelectrically reading the proof print TP, the scanned image itself is blurry due to defocus and flare of an optical system of the reading means 21. As a result, accurate position matching of the converted scanned image with the original image is difficult.

Therefore, by finding the average of each area of n×n pixels in the original image and in the converted scanned image and by relating the average of each area in the original image to the average of the corresponding area in the converted scanned image to find LUT2, accurate position matching between the original image and the converted scanned image is not necessary. Furthermore, the amount of operation can be reduced compared to the case of calculating LUT2 by using the original image and the converted scanned image as they are.

The second conversion means 24 converts the original image data S1 (R1, G1, B1) into the Lab color space and obtains the converted original image data S1' (L1, a1, b1).

The third conversion means 25 obtains the print image data S3 (R3, G3, B3) by converting the converted original image data S1' into the printing color space according to LUT3. LUT3 is found in the following manner. The same color chart as the color chart used for finding LUT1 is printed by the printing means 26. The color chart is subjected to colorimetry and a relationship between RGB data values and calorimetric values in the Lab color space is found as a three-dimensional look-up table to be used as LUT3.

Figure 3:
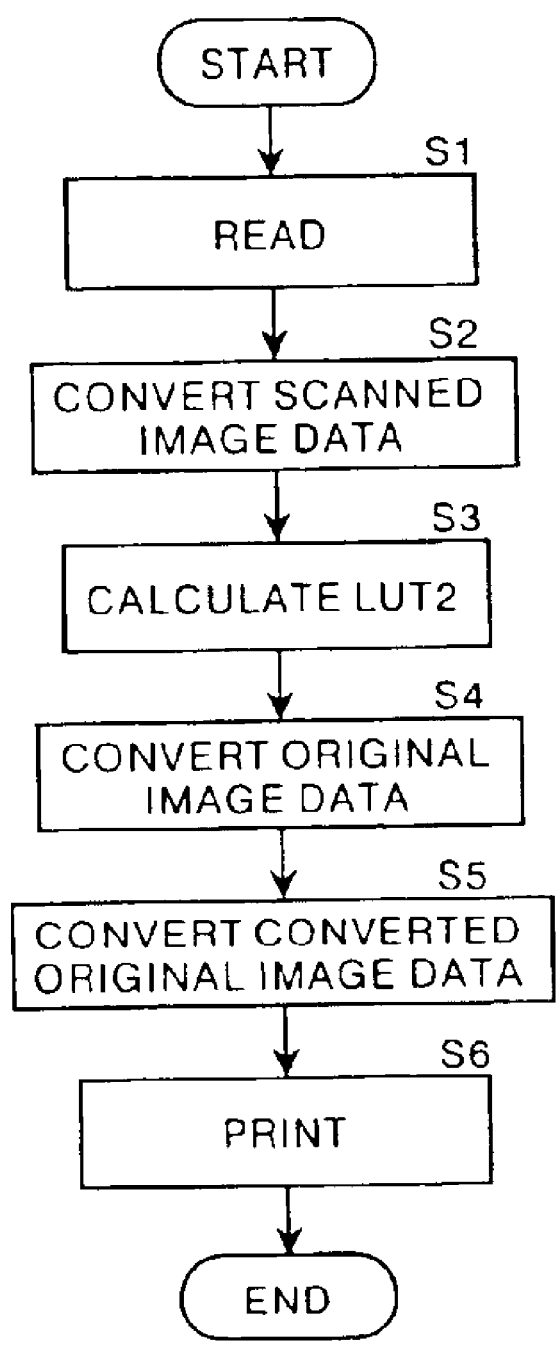
FIG. 3 is a flow chart showing operation of the first embodiment.

Operation of the first embodiment will be explained next. FIG. 3 is a flow chart showing the operation of the first embodiment. The reading means 21 reads the proof print TP and obtains the scanned image data S2 (Step S1). The first conversion means 22 divides the scanned image data S2 into the n×n pixels and finds the average of the pixel values in each area. The average is converted into the Lab color space by using LUT1, and the converted scanned image data S2' are obtained (Step S2). The converted scanned image data S2' are input to the calculation means 23 and LUT2 is calculated from the relationship between the data values of the original image data S1 and the data values of the converted scanned image data S2' (Step S3).

LUT2 is input to the second conversion means 24 and the second conversion means 24 obtains the converted original image data S1' by converting the original image data S1 into the Lab color space by using LUT2 (Step S4). The converted original image data S1, are input to the third conversion means 25 and the third conversion means 25 obtains the print image data S3 by converting the converted original image data S1' into the printing color space by referring to LUT3 (Step S5). The printing means 26 outputs the print image data S3 as the print P1 (Step S6) to end the procedure.

As has been described above, in the first embodiment, the converted scanned image data S2' are obtained by converting the scanned image data S2 into the Lab color space as the common color space corresponding to color perception, and the relationship between the converted scanned image data S2' and the original image data S1 is found as LUT2. The converted original image data S1' are then obtained by converting the original image data S1 into the Lab color space according to LUT2, and the print image data S3 are obtained by converting the converted original image data S1' from the Lab color space into the printing color space.

By converting the original image data S1 into the Lab color space, the data values of the converted original image data S1' correspond to the data values of the converted scanned image data S2'. Therefore, by converting the original image data S1 with reference to LUT2, colors of the proof print TP correspond to colors of the original image one to one. Meanwhile, by converting the converted original image data S1' into the printing color space, the data values of the print image data S3 correspond to the data values of the converted original image data S1'. Therefore, the colors of the original image and colors of the print P1 have one-to-one correspondence. As a result, the colors of the proof print TP and the colors of the print P1 correspond one to one. Consequently, color reproducibility of the print P1 agrees with color reproducibility of the proof print TP even when the printer 13 for obtaining the proof print TP has a color processing method or a coloring characteristic and/or recording method different from those of the printing means 26 for generating the print P1. As a result, the print P1 having the same color reproducibility as the proof print TP can be generated.

In the above embodiment, the calculation means 23 finds the relationship between the original image data S1 and the converted scanned image data S2' as the three-dimensional look-up table. However, the matrices M1~M3 in Equations (3) to (5) may be found and input to the second conversion means 24 so that the second conversion means 24 can convert the original image data S1 into the Lab color space by carrying out operations described by Equations (3) to (5) using the matrices M1~M3.

In the above embodiment, agreement between the color reproducibility of the proof print TP generated by the household color printer 13 and the color reproducibility of the print P1 generated by the printing means 26 in the laboratory is sought. However, the use 1 may own the same printing means as the printing means 26 in some cases. In such a case, when the same original image data S1 are printed, prints having the same color reproducibility should be obtained by the two printing means. However, due to a difference in a printing condition of the respective printing means, the prints obtained by using the two printing means cannot have the same color reproducibility in some cases. In such a case, the print obtained by the printing means of the user 1 is used as the proof print TP in the first embodiment. By carrying out the reading of the proof print TP, the generation of LUT2, the conversion of the original image data S1 and printing by the printing means 26 as in the first embodiment, the color reproducibility of the print P1 generated by the printing means 26 can be the same as the color reproducibility of the print obtained by the printing means of the user 1.

Figure 4:
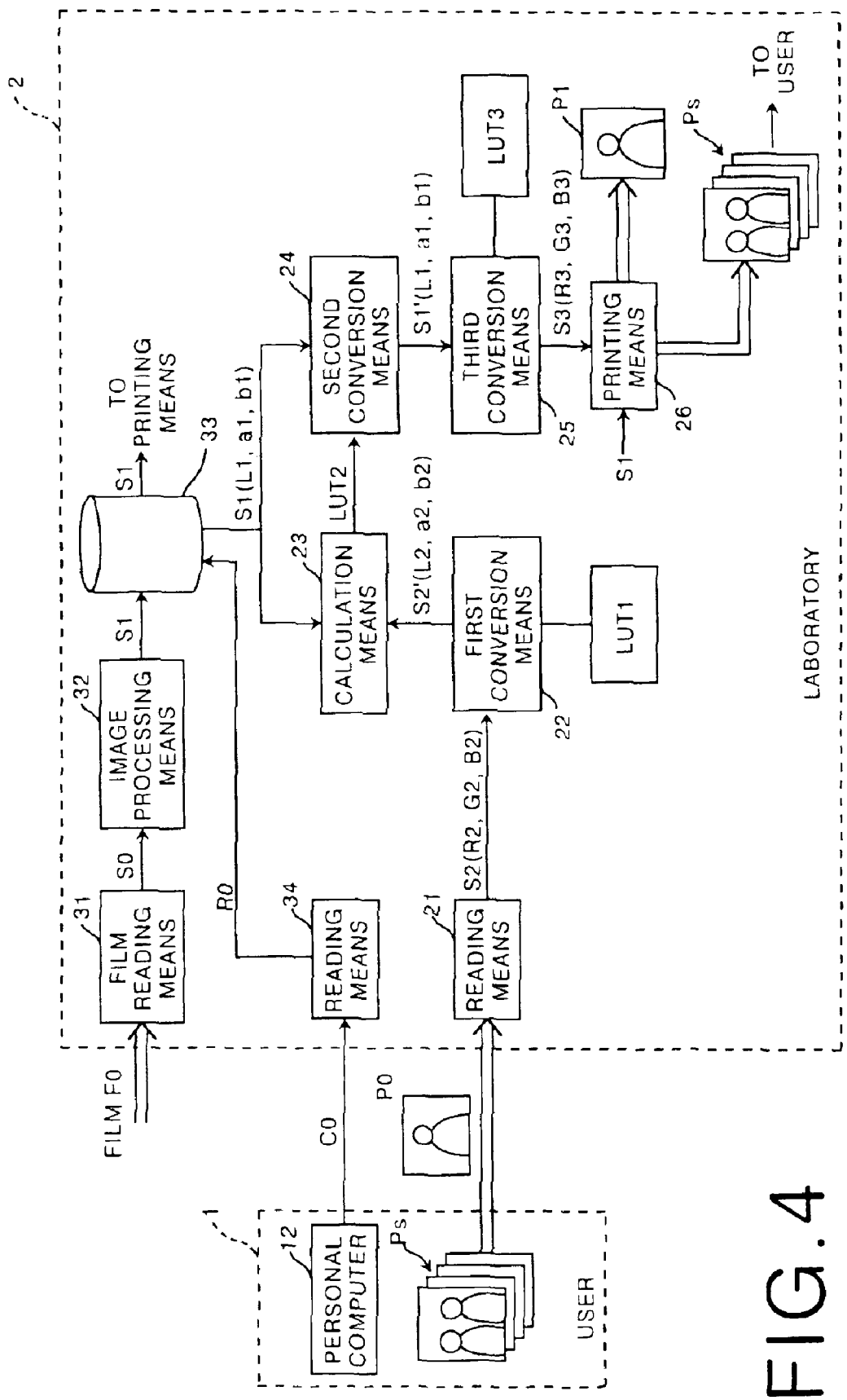
FIG. 4 is a block diagram showing a configuration of an image output system adopting an image correction apparatus as a second embodiment of the present invention.

A second embodiment of the present invention will be explained next. FIG. 4 is a block diagram showing a configuration of an image output system adopting an image correction apparatus as the second embodiment of the present invention. In the second embodiment, the same reference numerals are used for the same elements as in the first embodiment, and detailed explanation thereof is omitted. In the second embodiment, a user 1 requests from a laboratory 2 reading and printing of a film F0 on which images have been recorded by photographing, and requests from the laboratory 2 additional printing of a desired print P0 after receiving prints Ps generated by the previous printing. Therefore, the laboratory 2 comprises film reading means 31 for obtaining original image data S0 by reading the images recorded on the film F0, image processing means 32 for carrying out various kinds of image processing on the original image data S0 and for obtaining processed original image data S1, an image database 33 for storing the original image data S1, and reading means 34 for reading order information C0 generated by the user 1 as will be explained later and for issuing an instruction R0 for outputting the original image data S1 to the image database 33 based on the content of an order described in the order information C0. The film F0 is assumed to have been developed. The original image data obtained by the film reading means 31 in the second embodiment correspond to the original image data S0 obtained by the digital camera 11 in the first embodiment. The processed original image data obtained by the image processing means 32 correspond to the processed original image data S1 generated by the personal computer 12 in the first embodiment. Therefore, the same reference numerals are used.

Figure 5:
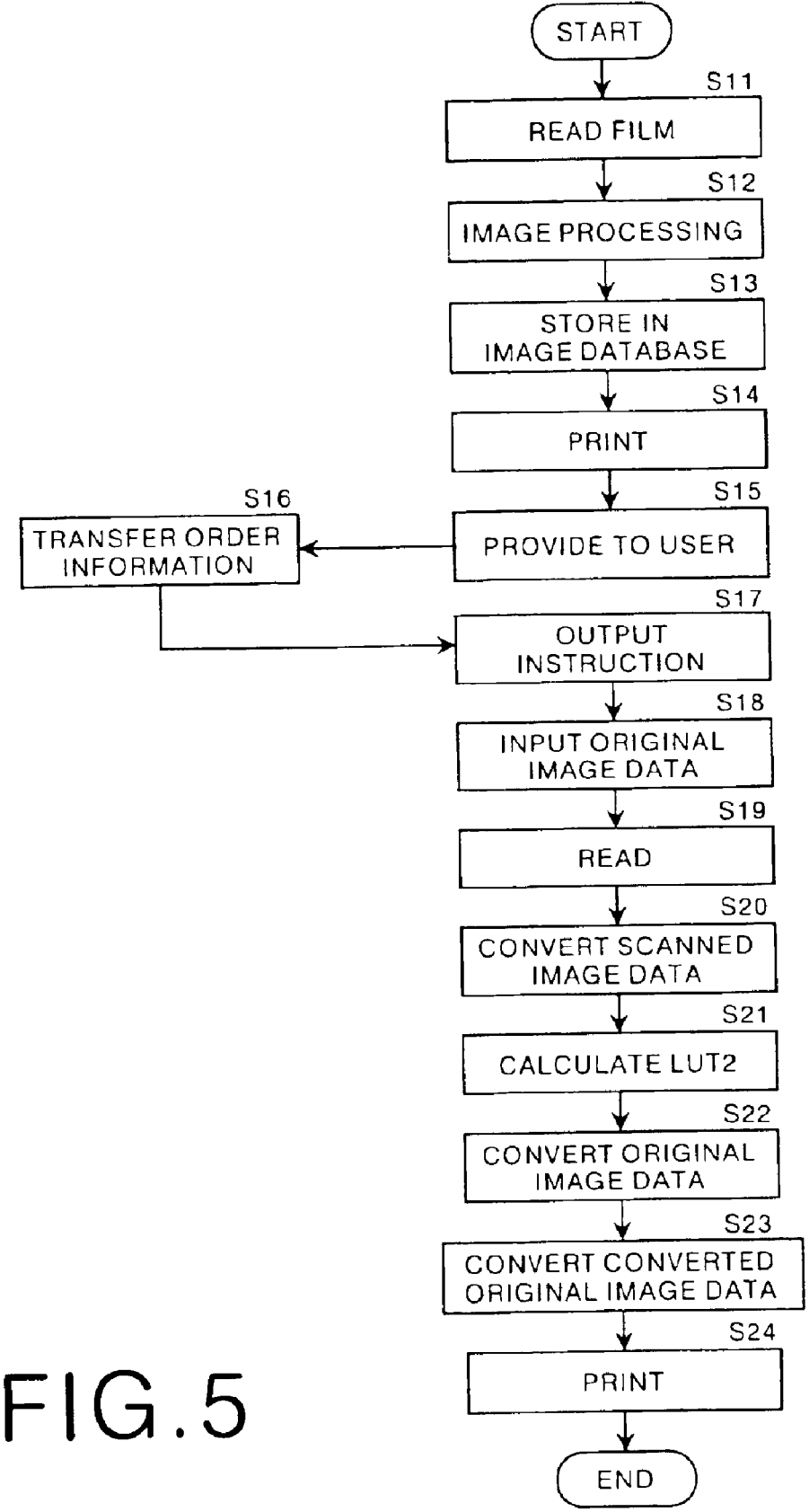
FIG. 5 is a flow chart showing operation of the second embodiment.

Operation of the second embodiment will be explained next. FIG. 5 is a flow chart showing the operation of the second embodiment. As shown in FIG. 5, the film F0 whose printing has been requested by the user 1 is read by the film reading means 31 in the laboratory 2 and the original image data S0 are obtained (Step S11). The image processing means 32 carries out the image processing on the original image data S0, and the processed image data S1 are obtained (Step S12). The processed original image data S1 are stored in the database 33 (Step S13). Meanwhile, the original image data S1 are input to printing means 26 and the prints Ps corresponding to frames of the film F0 are printed (Step S14). The prints Ps are then provided to the user 1 (Step S15). At this time, file names of the prints Ps are printed on paper or the like and provided to the user 1. Alternatively, a text file describing the file names therein may be recorded in a recording medium such as an FD and provided to the user 1.

The user 1 selects the print P0 for additional printing from the prints Ps, and generates the order information C0 for requesting the additional printing of the print P0, by using a personal computer 12. FIG. 6 shows the content of the order described in the order information C0. As shown in FIG. 6, the order information C0 describes preference of a white margin of the print and glossy or non-glossy photosensitive material, in addition to the file name of the print to be printed additionally and the quantity of prints, for example. The personal computer 12 is connected to the laboratory 2 via a network. The user 1 transfers the order information C0 to the laboratory 2 via the network (Step S16) and mails the print P0 to the laboratory 2. The order information C0 may be mailed to the laboratory 2 together with the print P0, by being recorded in a recording medium such as an FD.

The reading means 34 of the laboratory 2 reads the order information C0 and inputs the output instruction R0 to the image database 33 for reading the original image data S1 having the file name corresponding to the order content (Step S17). The image database 33 inputs the original image data S1 to calculation means 23 and second conversion means 24 (Step S18). Meanwhile, the print P0 is delivered to the laboratory 2, and reading means 21 reads the print P0 to obtain scanned image data S2 (Step S19). First conversion means 22 converts the scanned image data S2 into the Lab color space by referring to LUT1 and converted scanned image data S2' are obtained (Step S20). The converted scanned image data S2' are input to the calculation means 23 and LUT2 is generated as a relationship between data values of the original image data S1 and the converted scanned image data S2' (Step S21).

LUT2 is input to the second conversion means 24 and the original image data S1 are converted into the Lab color space by using LUT2 to generate converted original image data S1' (Step S22). The converted original image data S1' are input to third conversion means 25 and converted into a printing color space with reference to LUT3, to generate print image data S3 (Step S23). The printing means 26 outputs the print image data S3 as a print P1 (Step S24) to end the procedure.

As has been described above, in the second embodiment, the print P1 having the same color reproducibility as the print P0 can be obtained at the time of additional printing, even if the printing condition is not the same as at the time of generating the print P0.

In the second embodiment, the print P0 is selected from the prints Ps generated by the laboratory 2. However, a print P0' for additional printing may be selected from prints Ps' generated by a laboratory other than the laboratory 2, and only additional printing maybe requested from the laboratory 2. In this case, original image data S1 are not stored in the laboratory 2. Therefore, the user 1 may provide the original image data S1 to the laboratory 2. Alternatively, the laboratory 2 may be connected to the laboratory that generated the prints Ps' via a network and the original image data S1 are read by the laboratory 2 by accessing an image database of the laboratory that generated P0'. In this manner, a print P1' having the same color reproducibility as the print P0' can be generated, as in the second embodiment.

Figure 7:
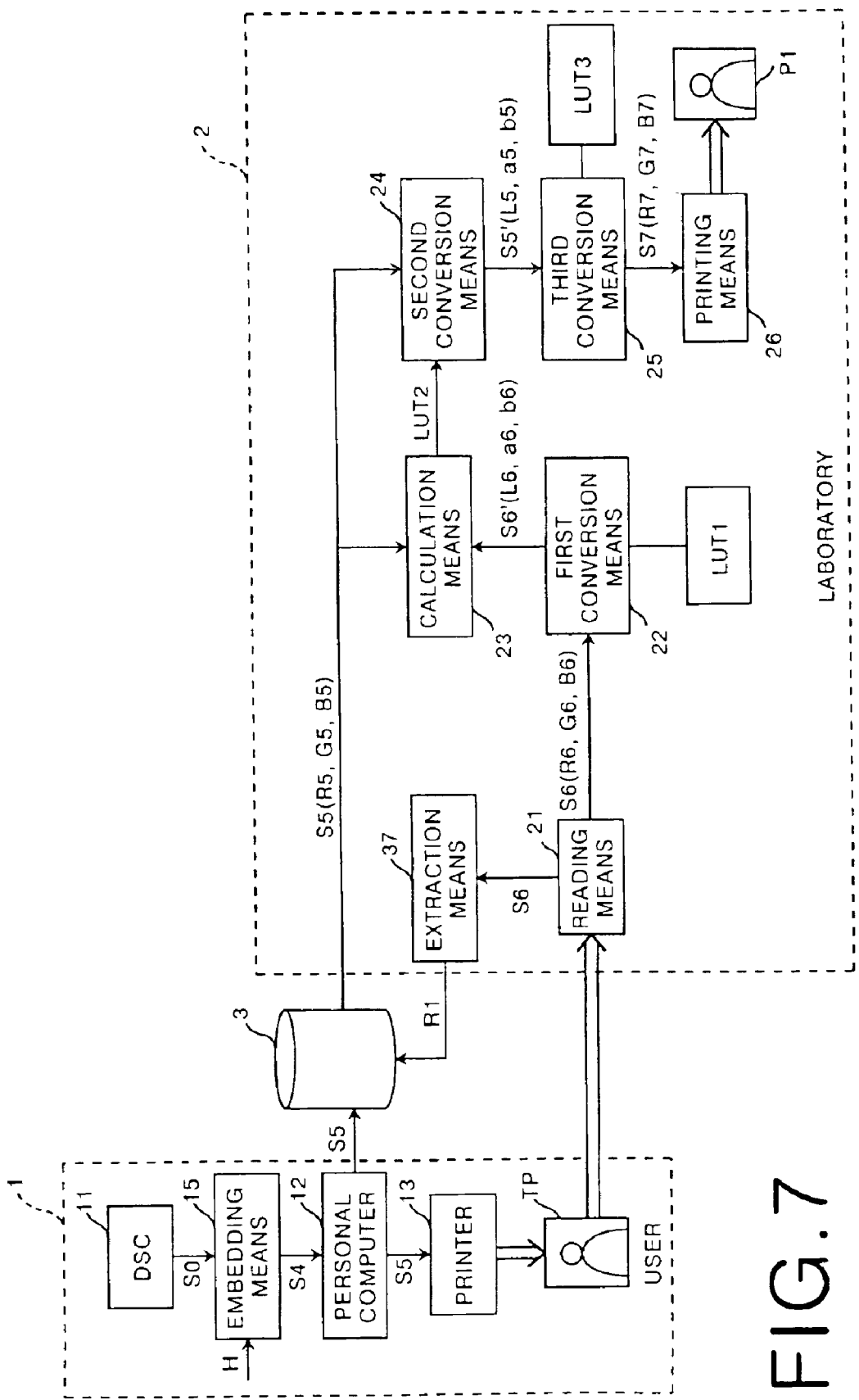
FIG. 7 is a block diagram showing a configuration of an image output system adopting an image correction apparatus as a third embodiment of the present invention.

A third embodiment of the present invention will be explained next. FIG. 7 is a block diagram showing a configuration of an image output system adopting an image correction apparatus as the third embodiment of the present invention. In the third embodiment, the same elements as in the first embodiment have the same reference numerals and detailed explanation thereof is omitted. In the third embodiment, a user 1 secretly embeds ID information H in original image data S0 obtained by using a digital camera 11, and original image data S4 having the ID information H embedded therein are obtained. The original image data S4 are subjected to the same processing carried out on the original image data S1 in the first embodiment. Therefore, the user 1 has embedding means 15 for secretly embeding the ID information H in the original image data S0, and a laboratory 2 has extraction means 37 for extracting the ID information H from scanned image data S6 (R6, G6, B6) obtained by reading a proof print TP by using reading means 21 thereof and for issuing an instruction R1 to an image server 3 to output original image data S5 corresponding to the ID information H. The original image data S4 having the ID information H embedded therein are subjected to the image processing as in the first embodiment by a personal computer 12 and the original image data S5 (R5, G5, B5) after the image processing are obtained. The proof print TP is generated by printing the original image data S5 by using a printer 13. The original image data S5 are stored in relation to the ID information H in the image server 3 connected to the personal computer 12 of the user 1 and to the laboratory 2 via a network.

In the third embodiment, the image data obtained by the reading means 21 and first conversion means 22 are called the scanned image data S6 (R6, G6, B6) and converted scanned image data S6' (L6, a6, b6), respectively. Image data obtained by second conversion means 24 through conversion of the original image data S5 are called converted original image data S5' (L5, a5, b5) and image data obtained by third conversion means 25 are called print image data S7 (R7, G7, B7).

Figure 8A:
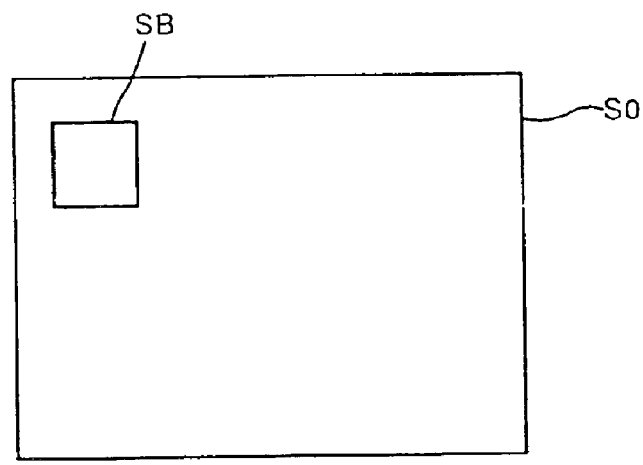
FIGS. 8A and 8B show positions of subplanes.
Figure 8B:
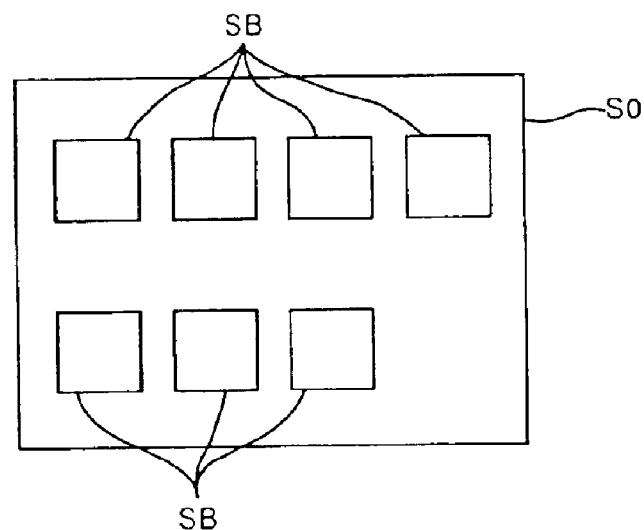

The embedding means 15 secretly embeds the ID information H in the original picture data S0, and obtains the original image data S4 having the ID information H embedded therein. Hereinafter, how the ID information H is embedded by the embedding means 15 will be explained. An original image (hereinafter called S0) represented by the original image data S0 is an image comprising m×n pixels of 8-bit RGB data. First, subplanes SB each comprising p×q pixels (p<m, q<n) are generated at several-pixel intervals from the original image S0. The number of the subplanes SB in the original image S0 may be one as shown in FIG. 8A, or larger than one as shown in FIG. 8B. In this embodiment, seven subplanes SB are used as shown in FIG. 8B. Eight bits comprising three lower bits of each of the R channel and B channel and two lower bits of the G channel are used as a bit plane of the ID information H to be embedded.

Figure 9:
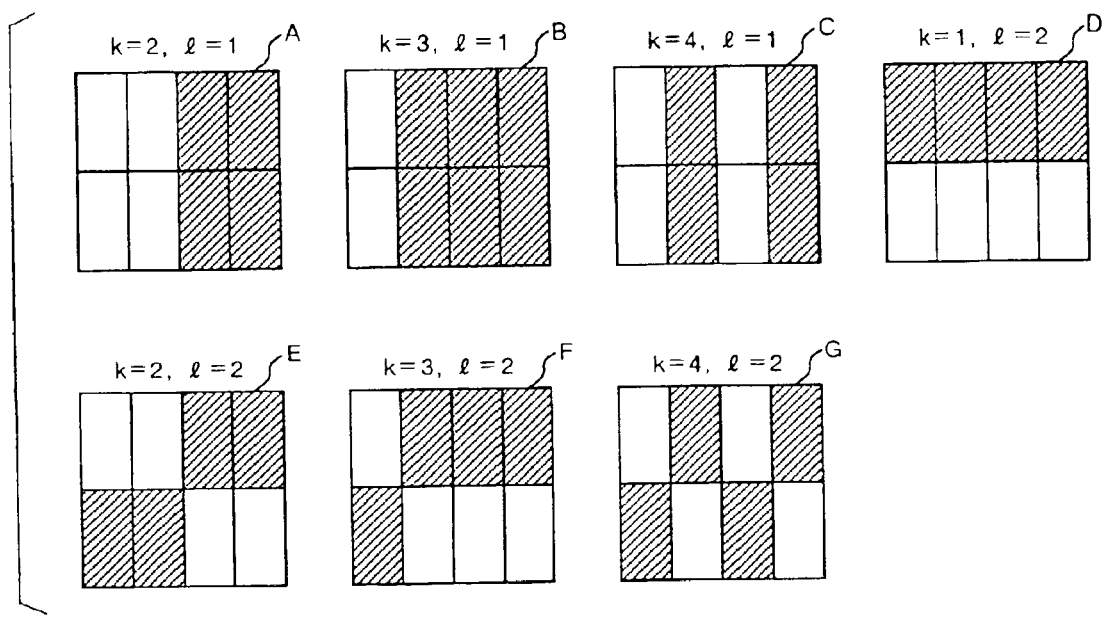
FIG. 9 shows modulation patterns.

If the ID information H is described in 16 bits, 7 bits each are assigned to the R and B channels while 2 bits are assigned to the G channel. The number of bits assigned to the G channel is smaller than the number of bits assigned to the R channel or the B channel, since human eyes are most sensitive to the G channel. First, how the information is embedded in the R channel will be explained. Since the 7-bit information is embedded in the R channel, seven types of modulation patterns are prepared for an area of p×q pixels which has the same size as the subplanes SB. For example, as shown in FIG. 9, each of the subplanes SB is divided into 8 areas, and 7 types of modulation patterns A~G modulated in a period of 2 p/k (k=1, 2, 3, 4) in an x direction and 2 q/l (l=1, 2) in a y direction are used for the areas. The case of k=l=1 is not used as the modulation pattern. If each of the subplanes SB is divided into 8 areas as shown in FIG. 9, the information can be embedded in each of the areas, which will be explained later, as long as each of the areas has one pixel. Therefore, the subplanes SB having at least 4×2 pixels each are sufficient.

A state of ON or OFF of hatched areas of the seven modulation patterns A~G corresponds to 1 or 0 of the 7 bits assigned to the R channel, while the number of the areas being ON is used as a pixel value of the hatched areas. In this manner, the 7-bit information can be embedded in the subplanes SB having the p×q pixels each. In other words, if the hatched areas in the patterns A~G shown in FIG. 9 are ON and the others are OFF while hatched areas in patterns A'~G' shown in FIG. 10 wherein the patterns A~G in FIG. 9 are inverted are ON and the others are OFF, the 7-bit information can be represented by using the patterns. In each of the patterns A~G and A'~G', the number of the ON areas takes a value ranging from 0 to 7. Therefore, if the number of the hatched areas is used as the pixel value of the hatched areas, the pixel value of the hatched areas takes a value ranging from 0 to 7, and can be embedded in the pixel values of the lower 3 bits of the R channel in each of the subplanes SB.

For the B channel, the 7-bit information can be embedded in the lower 3 bits, as in the case of the R channel. Meanwhile, for the G channel, each of the subplanes SB having the p×q pixels is divided into two areas and two modulation patterns are used. By switching the modulated areas on and off, the 2-bit information can be represented. The number of the ON areas can vary between 0 and 2. Therefore, the 2-bit information can be embedded in the subplanes SB as the pixel value of the lower 2 bits of the G channel.

By embedding the 16-bit ID information H in the RGB channels of the original image data S0 as has been described above, the original image data S4 having the ID information H can be obtained. Since the ID information H is embedded dispersedly in the lower 3 bits and the lower 2 bits of the RGB channels, the ID information can hardly be perceived by human eyes even when the original picture data S4 are reproduced.

The personal computer 12 may have the same function as the embedding means 15, or the ID information H may be embedded after the image processing is carried out by the personal computer 12.

The original image data S5 after the image processing by the personal computer 12 are stored in the image server 3. At this time, the original image data S5 are stored by being related to the ID information H.

Figure 10:
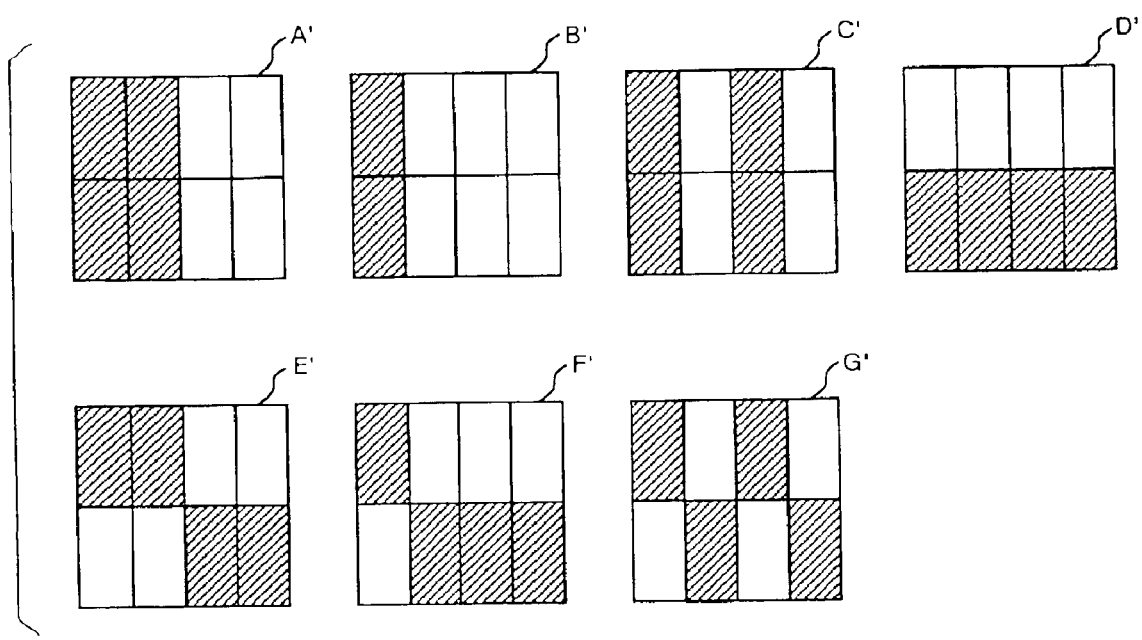
FIG. 10 shows other modulation patterns.

The extraction means 37 of the laboratory 2 extracts the ID information H from the scanned image data S6 (R6, G6, B6) obtained by reading the proof print TP by using the reading means 21. More specifically, the bit plane of the lower 3 bits of each of the R and B channels and the lower 2 bits of the G channel is extracted. The modulation patterns of the subplanes SB in the bit plane and the modulation patterns shown in FIGS. 9 and 10 are subjected to pattern matching, and correlation therebetween is found. By the pattern matching, which of the modulation patterns are embedded is detected, and the 16-bit information can be extracted as the ID information H. The extraction means 37 inputs the instruction R1 to the image server 3 to output the original image data S5 corresponding to the ID information H.

Figure 11:
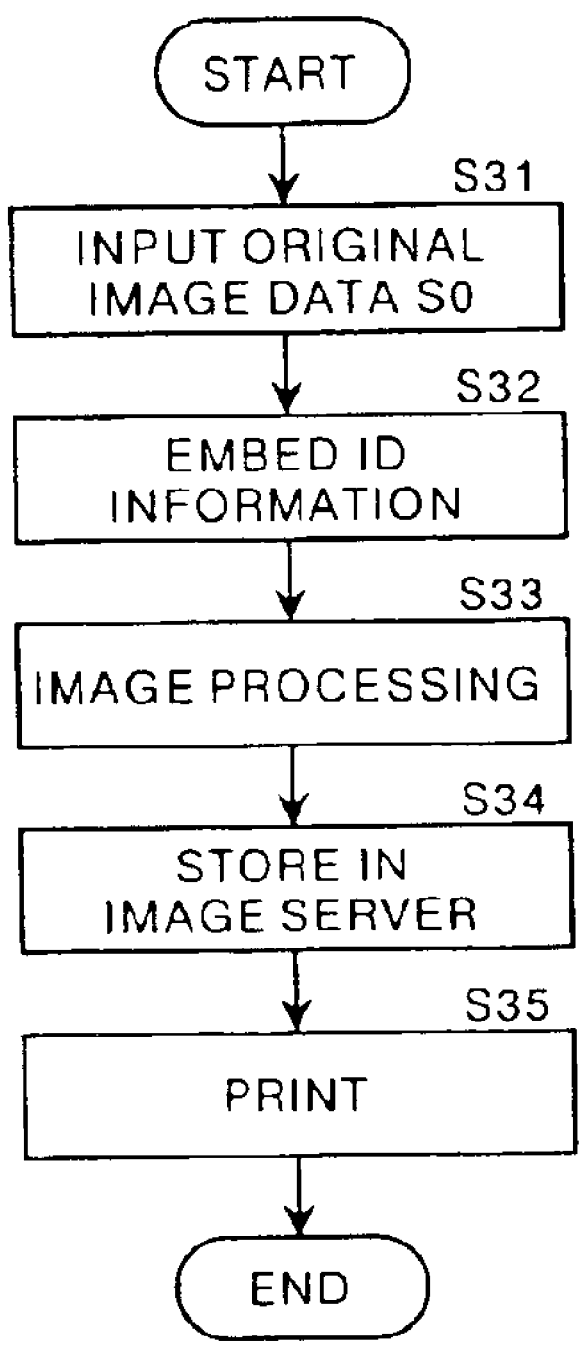
FIG. 11 is a flow chart showing operation of the third embodiment (part 1)

Operation of the third embodiment will be explained next. FIG. 11 is a flow chart showing the operation of the third embodiment until the proof print TP is printed. The original image data S0 obtained by the user 1 with the digital camera 11 are input to the embedding means 15 (Step S31), and the ID information H is embedded. The original image data S4 having the ID information embedded therein are obtained (Step S32). The original image data S4 are subjected to the image processing by the personal computer 12, and the processed original image data S5 are obtained (Step S33). The original image data S5 are stored in the image server 3 by being related to the ID information H (Step S34). Meanwhile, the original image data S5 are input to the printer 13 and the proof print TP is generated (Step S35). The above is the procedure until the proof print TP is generated.

Figure 12:
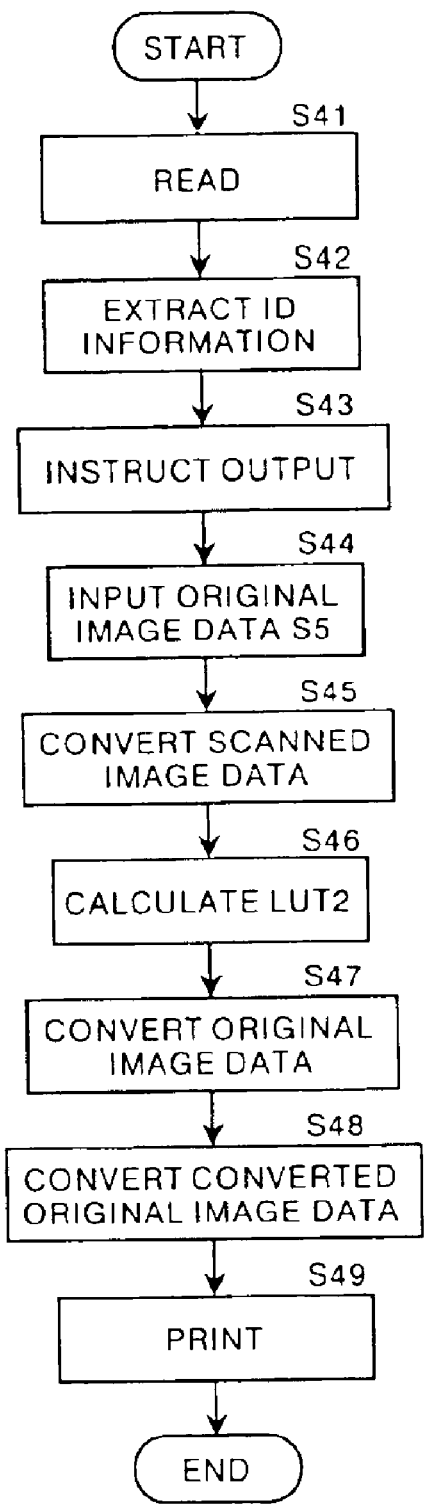
FIG. 12 is a flow chart showing operation of the third embodiment (part 2)

FIG. 12 is a flow chart showing operation of the laboratory 2 in the third embodiment. The reading means 21 reads the proof print TP and the scanned image data S6 are obtained (Step S41). The scanned image data S6 are input to the extraction means 37 and the ID information H is extracted, as has been described above (Step S42). The extraction means 37 issues the instruction R1 to the image server 3 to output the original image data S5 corresponding to the ID information H (Step S43). The image server 3 reads the original image data S5 based on the instruction R1 and transfers the original image data S5 to the laboratory 2. The original image data S5 are then input to calculation means 23 and the second conversion means 24 of the laboratory 2 (step S44).

Meanwhile, the first conversion means 22 converts the scanned image data S6 into the Lab color space by referring to LUT1 and the converted scanned image data S6' are obtained (Step S45). The converted scanned image data S6' are input to the calculation means 23, and LUT2 is calculated as a relationship between data values of the original image data S5 and the converted scanned image data S6' (Step S46).

LUT2 is input to the second conversion means 24 and the original image data S5 are converted into the Lab color space with reference to LUT2. The converted original image data S5' are obtained (Step S47). The converted original image data S5' are input to the third conversion means 25, and converted into a printing color space by referring to LUT3. In this manner, the print image data S7 are obtained (Step S48). Printing means 26 outputs the print image data S7 as a print P1 (Step S49) to end the procedure.

As has been described above, in the third embodiment, the print P1 having the same color reproducibility as the proof print TP can be obtained.

Since the original image data S5 has the ID information H embedded therein, the proof print TP has the ID information H. Therefore, the user 1 can obtain the print P1 having the same color reproducibility as the proof print TP through extraction of the ID information H from the scanned image data S6, if the user 1 simply provides the proof print TP to the laboratory 2. Therefore, the user 1 does not need to provide information for specifying the original image data S5 to the laboratory 2, which is convenient for the user 1.

In the third embodiment, the embedding means 15 secretly embeds the ID information H in the original image data S0. Therefore, the ID information H can be embedded in the original image data S0 without being known.

In the third embodiment, the 7-bit information is embedded by using the modulation patterns shown in FIGS. 9 and 10. However, by dividing the area of p×q pixels in the subplane SB into seven areas and by generating modulation patterns of ON (=1) and OFF (=0) for the areas, the 7-bit information can also be embedded in the subplane SB. In this case, if the number of the areas being ON is used as the pixel value of the areas, the pixel value can range from 0 to 7. Therefore, the information can be embedded in the lower 3 bits of R and B as in the third embodiment.

In this case, by using a plurality of the subplanes SB in an original image S5 represented by the original image data S5, the original image data S5 can be read from the image server 3 if at least one of the subplanes SB exists even in the case where the proof print TP is partially damaged, for example.

In the third embodiment, the ID information H is secretly embedded in the original image data S0. However, the ID information H may be printed on the back of the proof print TP by using a bar code or characters. In the case where the proof print has a white margin, the ID information H can be printed on the margin. In this case, the reading means 21 reads the ID information H recorded on the proof print TP and inputs the information to the extraction means 37. The extraction means 37 inputs the instruction R1 to the image server 3 based on the ID information H input thereto.

In the third embodiment, agreement between the color reproducibility of the proof print TP generated by the household color printer 13 and the color reproducibility of the print P1 generated by the printing means 26 in the laboratory 2 is sought. However, the user 1 may have the same printing means as the printing means 26 in some cases. In such a case, when the same original image data S4 are printed, prints having the same color reproducibility should be obtained by the two printing means. However, due to a difference in a printing condition of the two printing means, the prints obtained by using the two printing means may not have the same color reproducibility in some cases. In such a case, the print obtained by the printing means of the user 1 is used as the proof print TP in the third embodiment. By carrying out the reading of the proof print TP, extraction of the Information H, the generation of LUT2, the conversion of the original image data S5 and printing by the printing means 26 as in the third embodiment, the color reproducibility of the print P1 generated by the printing means 26 can be made the same as the color reproducibility of the print obtained by the printing means of the user 1.

Figure 13:
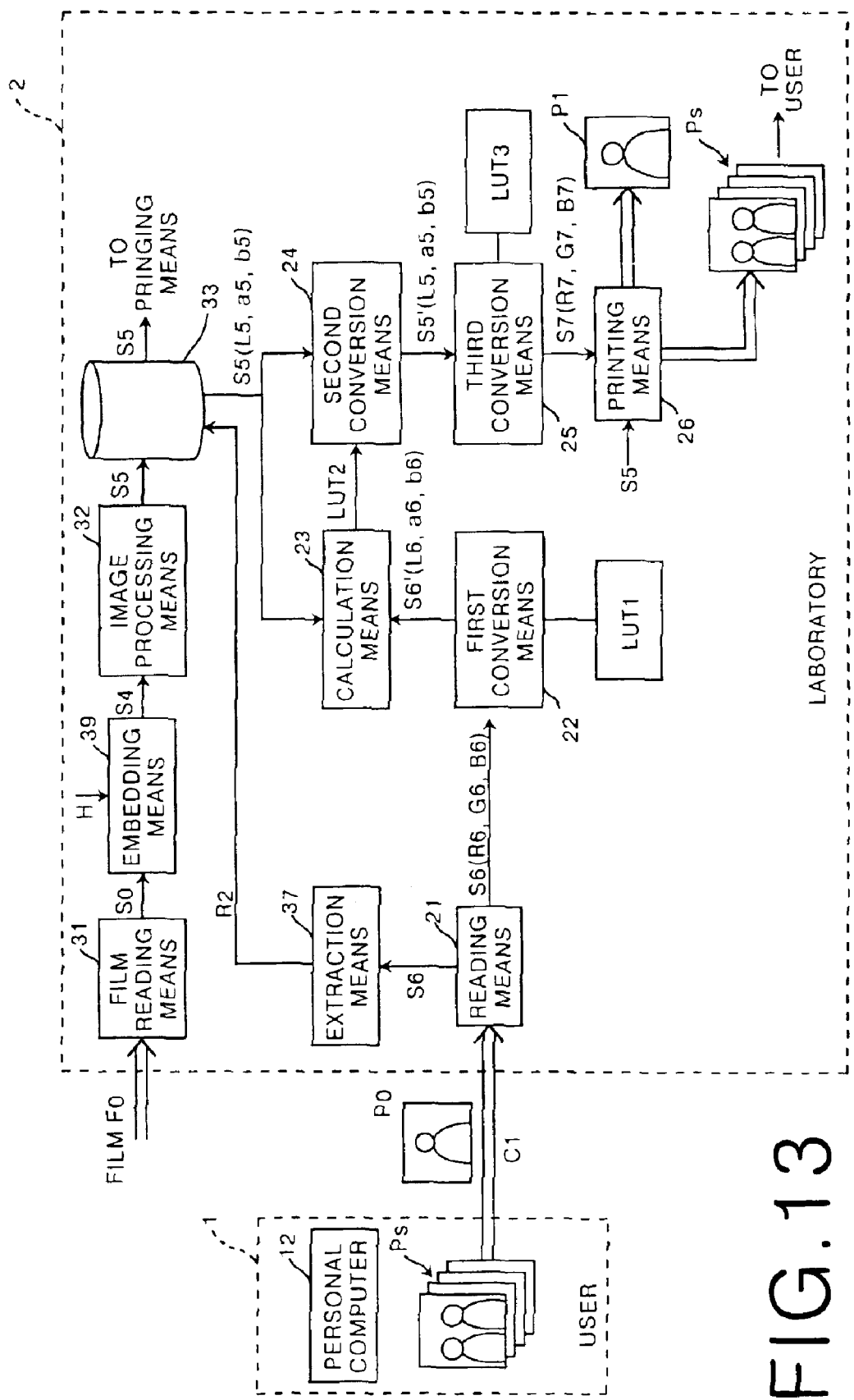
FIG. 13 is a block diagram showing an image output system adopting an image correction apparatus as a fourth embodiment of the present invention.

A fourth embodiment of the present invention will be explained next. FIG. 13 is a block diagram showing a configuration of an image output system adopting an image correction apparatus as the fourth embodiment of the present invention. In the fourth embodiment, the same elements as in the first to third embodiments have the same reference numerals and detailed explanation thereof is omitted. In the fourth embodiment, a user 1 requests from a laboratory 2 reading and printing of a film F0 recording images obtained by photographing, and selects a desired print P0 from prints Ps to request additional printing from the laboratory 2, as in the second embodiment. In the laboratory 2, ID information H is embedded in original image data S0 obtained by film reading means 31, and original image data S5 having the ID information H embedded therein and having been subjected to image processing are stored in an image database 33 in relation to the ID information H.

Therefore, the laboratory 2 comprises embedding means 39 for secretly embedding the ID information H in the original image data S0 obtained by the film reading means 31 and extraction means 37 for extracting the ID information H from scanned image data S6 obtained by reading the print P0 by reading means 21 and for issuing an output instruction R2 to the image database 33 to output the original image data S5 corresponding to the ID information H, in addition to the film reading means 31, image processing means 32, and the image database 33.

In the fourth embodiment, the reference numerals added to the image data correspond to the reference numerals in the third embodiment. In other words, the image data having the ID information H embedded by the embedding means 39 are image data S4, and image data having been subjected to the image processing by the image processing means 32 are the image data S5. Image data obtained by the reading means 21 are the scanned image data S6 (R6, G6, B6), and image data obtained by first conversion means 22 are image data S6'(L6, a6, b6). Image data obtained by second conversion means 24 after conversion of the original image data S5 are converted original image data S5' (L5, a5, b5), and image data obtained by third conversion means 25 are print image data S7 (R7, G7, B7). The output instruction from the extraction means 37 is called R2.

Processing to embed the ID information H in the original image data S0 by using the embedding means 39 is the same processing carried out by the embedding means 15 in the third embodiment. Therefore, detailed explanation thereof is omitted.

Figure 14:
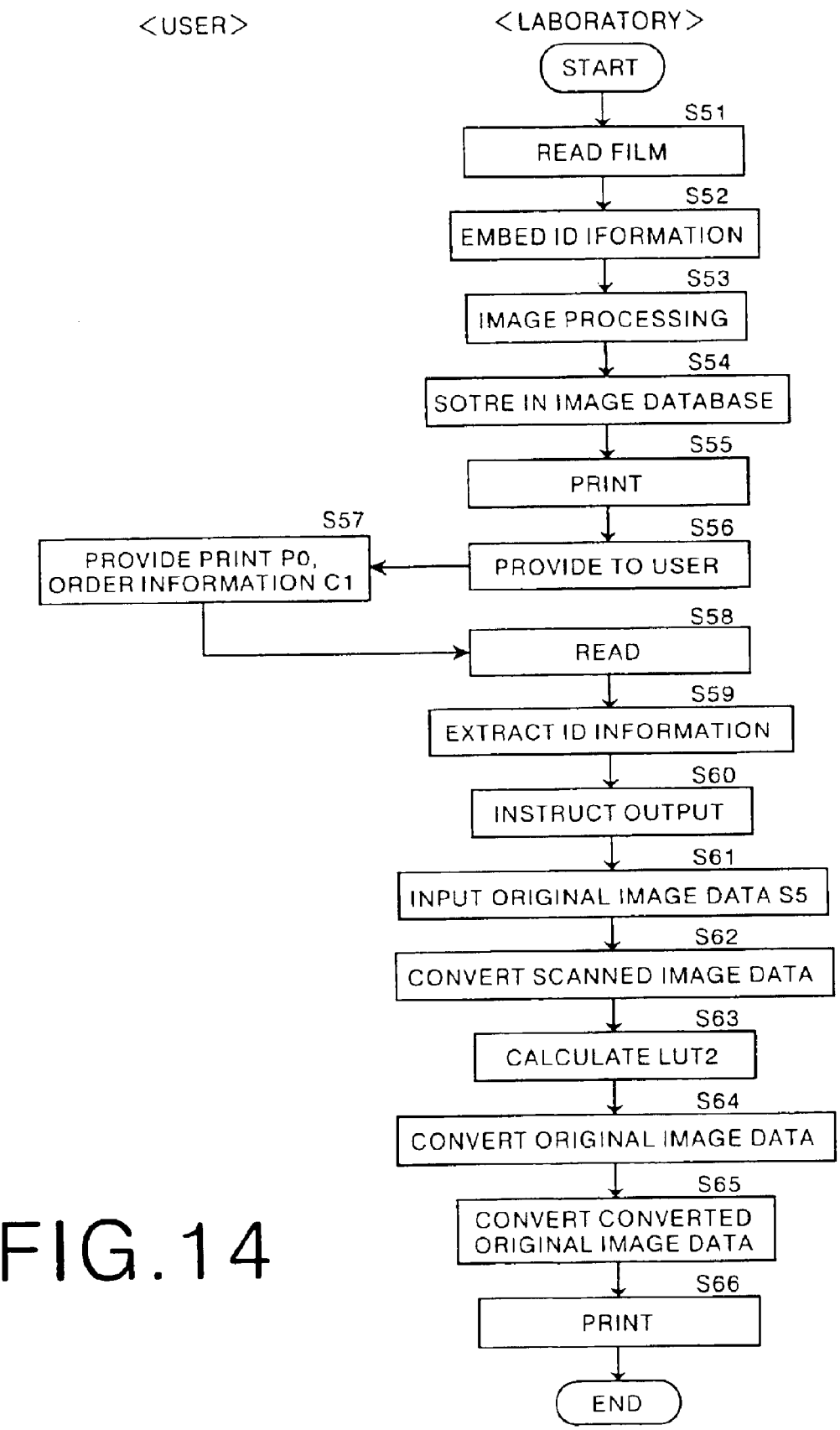
FIG. 14 is a flow chart showing operation of the fourth embodiment.

Operation of the fourth embodiment will be explained next. FIG. 14 is a flow chart showing the operation of the fourth embodiment. As shown in FIG. 14, in the laboratory 2, the film F0 whose printing has been requested by the user 1 is read by the film reading means 31 and the original image data S0 are obtained (Step S51). The embedding means 39 embeds the ID information H in the original image data S0 and the original image data S4 having the ID information H embedded therein are obtained (Step S52). The image processing means 32 carries out the image processing on the original image data S4 and the processed original image data S5 are obtained (Step S53). The original image data S5 are stored in the image database 33 by being related to the ID information H (Step S54). Meanwhile, the original image data S5 are input to printing means 26 and the prints Ps corresponding to frames in the film F0 are output (Step S55). The prints Ps are provided to the user 1 (Step S56).

The user 1 selects the print P0 for additional printing from the prints Ps, and generates order information C1 for requesting additional printing of the print P0 by using a personal computer 12. In the fourth embodiment, the order information C1 is generated by printing the content of the order and attached to the selected print P0. In this manner, the print P0 and the order information C1 are provided to the laboratory 2. The content of the order in the fourth embodiment is the same as the order content shown in FIG. 6, except for the file name omitted in the order information C1.

The user 1 provides the print P0 and the order information C1 attached thereto to the laboratory 2 by mailing or the like (Step S57). In the laboratory 2, the reading means 21 reads the print P0 and the scanned image data S6 are obtained (Step S58). The scanned image data S6 are input to the extraction means 37, and the ID information H is extracted as has been described above (Step S59). The extraction means 37 issues the output instruction R2 to the image database 33 for outputting the original image data S5 corresponding to the ID information H (Step S60). The image database 33 reads the original image data S5 based on the instruction R2 and transfers the data to the laboratory 2. The original image data S5 are input to calculation means 23 and the second conversion means 24 of the laboratory 2 (Step S61).

Meanwhile, the scanned image data S6 are converted into the Lab color space by the first conversion means 22 referring to LUT1, and the converted scanned image data S6' are obtained (Step S62). The converted scanned image data S6' are input to the calculation means 23 and LUT2 is calculated as a relationship between data values of the original image data S5 and the converted scanned image data S6' (Step S63).

LUT2 is input to the second conversion means 24 and the original image data S5 are converted into the Lab color space according to LUT2. In this manner, the converted original image data S5' are obtained (Step S64). The converted original image data S5' are input to the third conversion means 25 and converted into a printing color space according to LUT3. In this manner, the print image data S7 are obtained (Step S65). Meanwhile, the content of the order information C1 is input to the printing means 26. The printing means 26 outputs the print image data S7 as a print P1 based on the order information C1 (Step S66) to end the procedure.

As has been described above, the print P1 having the same color reproducibility as the print P0 can be obtained in the fourth embodiment, as in the first embodiment.

Since the original image data S5 has the ID information H embedded therein, the prints Ps have the ID information H embedded therein. Therefore, the print P1 having the same color reproducibility as the selected print P0 can be obtained by extracting the ID information H from the scanned image data S6, if the user 1 simply provides the print P0 to the laboratory 2. Therefore, the user 1 does not need to provide information for specifying the original image data S5 to the laboratory 2, which improves convenience for the user 1.

In the fourth embodiment, the ID information H can be added to the original image S0 without being known to others, since the embedding means 39 secretly embeds the ID information H into the original image S0.

In the fourth embodiment, the ID information H is secretly embedded in the original image data S0. However, the ID information H may be recorded on the prints Ps by using a bar code or characters on the back thereof. Alternatively, in the case where the prints Ps have a white margin, the ID information H may be printed on the white margin. In this case, the reading means 21 reads the ID information H recorded on the print P0 and input the information to the extraction means 37. The extraction means 37 outputs the instruction R2 to the image database 33 based on the ID information H.

What is claimed is:

1. An image correction method comprising the steps of:
    obtaining scanned image data by photoelectrically reading a proof print obtained from original image data representing an original image;
    carrying out a first color conversion for obtaining converted scanned image data by converting the scanned image data into a common color space corresponding to color perception;
    calculating a relationship between data values of the converted scanned image data and data values of the original image data as a color correspondence relationship;
    carrying out a second color conversion for obtaining converted original image data by converting the original image data into the common color space based on the color correspondence relationship;
    carrying out a third color conversion for obtaining print image data by converting the converted original image data from the common color space into a color space for printing; and
    obtaining a print based on the print image data.

2. An image correction method as defined in claim 1, the step of carrying out the first color conversion further comprising the steps of:
    averaging and sampling the scanned image data in each of areas having a predetermined range; and
    obtaining the converted scanned image data by converting the sampled scanned image data into the common color space, and the step of calculating further comprising the steps of:
    averaging and sampling the original image data in each of the areas having the predetermined range; and
    calculating, as the color correspondence relationship, a relationship between data values of a converted scanned image represented by the converted scanned image data and a sampled original image represented by the sampled original image data, at positions corresponding to each other in the sampled original image and in the converted scanned image.

3. An image correction method as defined in claim 1 or 2, wherein the color correspondence relationship is calculated as a look-up table.

4. An image correction apparatus comprising:
    image reading means or obtaining scanned image data by photoelectrically reading a proof print generated from original image data representing an original image;
    first color conversion means for obtaining converted scanned image data by converting the scanned image data into a common color space corresponding to color perception;
    calculation means for calculating a relationship between data values of the converted scanned image data and data values of the original image data as a color correspondence relationship;
    second color conversion means for obtaining converted original image data by converting the original image data into the common color space based on the color correspondence relationship;
    third color conversion means for obtaining print image data by converting the converted original image data from the common color space into a color space for printing; and printing means for obtaining a print based on the print image data.

5. An image correction apparatus as defined in claim 4, wherein the first color conversion means obtains the converted scanned image data by averaging and sampling the scanned image data in each of areas having a predetermined range and by converting the sampled scanned image data into the common color space, and the calculation means averages and samples the original image data in each of the areas having the predetermined range, and calculates the color correspondence relationship as a relationship between data values of a converted scanned image represented by the converted scanned image data and a sampled original image represented by the sampled original image data, at positions corresponding to each other in the sampled original image and in the converted scanned image.

6. An image correction apparatus as defined in claim 4 or 5, wherein the calculation means calculates the color correspondence relationship as a look-up table.

7. A computer-readable recording medium storing a program to cause a computer to execute a image correction method, the program comprising the procedures of:

obtaining scanned image data by photoelectrically reading a proof print generated from original image data representing an original image;

carrying out a first color conversion for obtaining converted scanned image data by converting the scanned image data into a common color space corresponding to color perception; calculating a relationship between data values of the converted scanned image data and data values of the original image data as a color correspondence relationship;

carrying out a second color conversion for obtaining converted original image data by converting the origin image data into the common color space based on the color correspondence relationship;

carrying out a third color conversion for obtaining print image data by converting the converted original image data from the common color space into a color space for printing; and obtaining a print based n the print image data.

8. A computer-readable recording medium as defined in claim 7, the procedure of carrying out the first color conversion further comprising the procedures of:

averaging and sampling the scanned image data in each of areas having a predetermined range; and obtaining the converted scanned image data by converting the sampled scanned image data into the common color space, and the procedure of calculating further comprising the procedures of:

averaging and sampling the original image data in each of the areas having the predetermined range; and calculating, as the color correspondence relationship, a relationship between data values of a converted scanned image represented by the converted scanned image data and a sampled original image represented by the sampled original image data, at positions corresponding to each other in the sampled original image and in the converted scanned image.

9. A computer-readable recording medium as defined in claim 7 or 8, the procedure of calculating being the procedure of calculating the color correspondence relationship al a look-up table.

* * * * *